United States Patent
Hirano et al.

(10) Patent No.: US 9,410,815 B1
(45) Date of Patent: Aug. 9, 2016

(54) SYSTEM AND METHOD FOR DISPLAYING DYNAMIC TEXT CONTENT WITH A DIGITAL MAP

(71) Applicant: GOOGLE INC., Mountain View, CA (US)

(72) Inventors: Takahito Hirano, Tokyo (JP); Ryo Kawaguchi, Meguro-Ku (JP); Masanori Goto, Tokyo (JP); Koichi Suematsu, Tokyo (JP); Pawel Szczepanski, Tokyo (JP); Takahiro Kosakai, Tokyo (JP); Naoto Kaneko, Tokyo (JP); Taj J. Campbell, San Francisco, CA (US); Peter Foo, Tokyo (JP); Kaori Kozai, Tokyo (JP)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/664,602

(22) Filed: Mar. 20, 2015

Related U.S. Application Data

(60) Provisional application No. 61/970,656, filed on Mar. 26, 2014.

(51) Int. Cl.
*G01C 21/26* (2006.01)
*G01C 21/34* (2006.01)
*G01C 21/36* (2006.01)

(52) U.S. Cl.
CPC ........ *G01C 21/3407* (2013.01); *G01C 21/3453* (2013.01); *G01C 21/3667* (2013.01)

(58) Field of Classification Search
CPC ................................. G01C 21/26; G01C 21/34
USPC .......................................................... 701/527
See application file for complete search history.

(56) References Cited

U.S. PATENT DOCUMENTS

| | | | |
|---|---|---|---|
| 8,024,111 B1 | 9/2011 | Meadows et al. | |
| 8,073,565 B2 * | 12/2011 | Johnson | H04W 4/025 455/404.2 |
| 8,126,903 B2 | 2/2012 | Lehmann et al. | |
| 8,296,266 B2 | 10/2012 | Lehmann et al. | |
| 8,352,303 B2 | 1/2013 | Lehmann et al. | |
| 8,543,441 B2 | 9/2013 | Siegel | |
| 8,583,668 B2 | 11/2013 | Higgins et al. | |
| 8,606,517 B1 | 12/2013 | Ehrlacher et al. | |
| 8,612,134 B2 * | 12/2013 | Zheng | G01S 19/14 701/400 |
| 8,645,181 B2 | 2/2014 | Lehmann et al. | |
| 8,706,401 B2 | 4/2014 | Lee | |
| 8,719,094 B1 | 5/2014 | Klein et al. | |

(Continued)

OTHER PUBLICATIONS

U.S. Appl. No. 13/728,554, filed Dec. 27, 2012.

*Primary Examiner* — Thomas Tarcza
*Assistant Examiner* — Alex C Dunn
(74) *Attorney, Agent, or Firm* — Marshall, Gerstein & Borun LLP

(57) ABSTRACT

An entry point card displayed within a mapping application viewport may display context and other data based on a calendar appointment and other data that the user might, predictably, want to search for upon opening the mapping application. Using appointment information from a calendar application, an entry point card might display a time the user must leave his current location in order to make the appointment on time. Or, using a history of the user's routine errands or trips, the entry point card may display predicted information. For example, the card may display an amount of time to get to work or other information.

15 Claims, 8 Drawing Sheets

(56) References Cited

U.S. PATENT DOCUMENTS

| | | | |
|---|---|---|---|
| 2002/0161517 A1* | 10/2002 | Yano | G01C 21/3407 701/420 |
| 2003/0204474 A1 | 10/2003 | Capek et al. | |
| 2008/0094678 A1 | 4/2008 | Uduki | |
| 2008/0255759 A1 | 10/2008 | Abhyanker | |
| 2009/0088962 A1* | 4/2009 | Jones | G06F 17/3087 701/519 |
| 2010/0094678 A1 | 4/2010 | Gupta et al. | |
| 2010/0123737 A1* | 5/2010 | Williamson | G01C 21/3647 345/672 |
| 2010/0175001 A1 | 7/2010 | Lazarus et al. | |
| 2010/0274865 A1 | 10/2010 | Frazier et al. | |
| 2010/0292921 A1 | 11/2010 | Zachariah et al. | |
| 2011/0022304 A1 | 1/2011 | Lee | |
| 2011/0125545 A1 | 5/2011 | Lehmann et al. | |
| 2011/0137929 A1 | 6/2011 | Lehmann et al. | |
| 2011/0153629 A1 | 6/2011 | Lehmann et al. | |
| 2011/0184943 A1 | 7/2011 | Norton et al. | |
| 2012/0253861 A1* | 10/2012 | Davidson | G06Q 10/08 705/7.11 |
| 2012/0290967 A1 | 11/2012 | Scott et al. | |
| 2013/0103450 A1 | 4/2013 | Lehmann et al. | |
| 2013/0297551 A1 | 11/2013 | Smith et al. | |
| 2013/0304349 A1* | 11/2013 | Davidson | G08G 1/0112 701/99 |

* cited by examiner

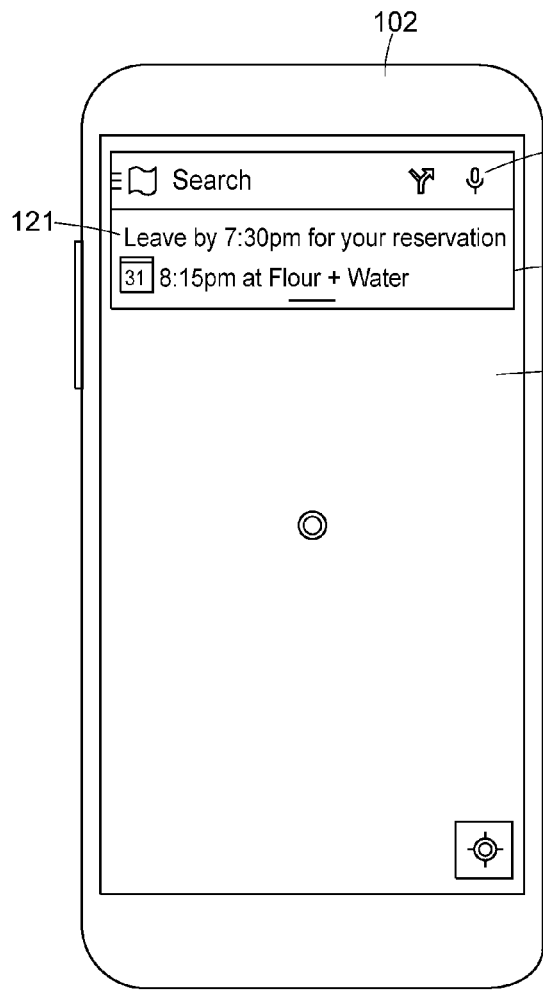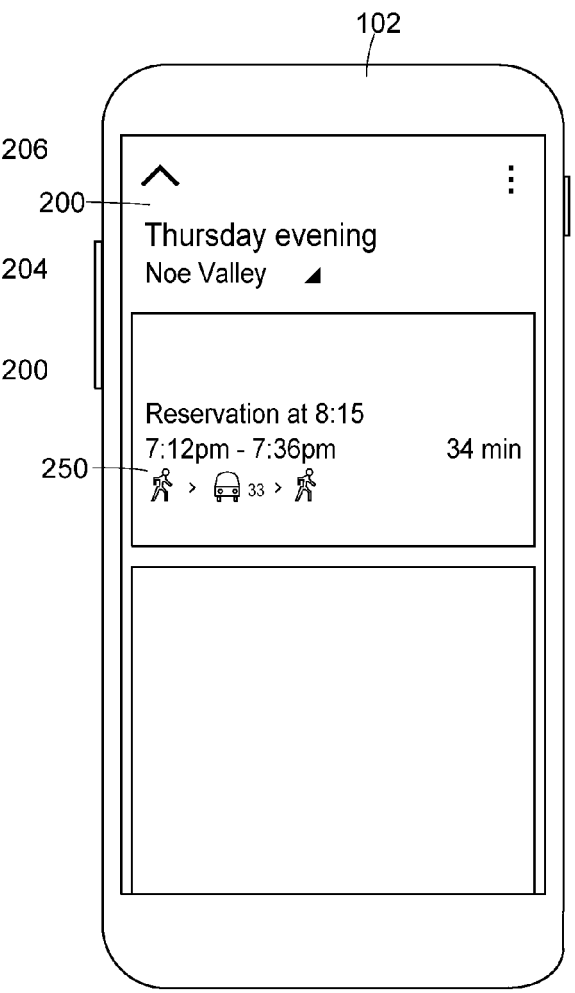
FIG. 2A                    FIG. 2B

SYSTEM AND METHOD FOR DISPLAYING DYNAMIC TEXT CONTENT WITH A DIGITAL MAP

CROSS-REFERENCE TO RELATED APPLICATIONS

This application claims the benefit of U.S. Provisional Application No. 61/970,656, filed Mar. 26, 2014, which is incorporated by reference herein.

FIELD OF TECHNOLOGY

The present disclosure relates to electronic map systems, and more specifically to a mapping system that displays an entry point for dynamic content in a mobile mapping system based on various user and location data.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Current online maps show the maps in a static state. Vectors describing both the map content and styling are sent to a user device in response to a request for specific locations. The data sent to the user device only represents the map data as it exists on the backend mapping servers. Digital maps are most often used as a tool to complete a search appointment. Users typically open a mapping application with an understanding that they will need to search for what they are looking for. While these static maps and static searching may be useful for general viewing and search appointments, they may not be appropriate in other dynamic contexts.

SUMMARY

Features and advantages described in this summary and the following detailed description are not all-inclusive. Many additional features and advantages will be apparent to one of ordinary skill in the art in view of the drawings, specification, and claims hereof. Additionally, other embodiments may omit one or more (or all) of the features and advantages described in this summary.

A computer-implemented method may integrate information related to a geographic area displayed within a viewport of a digital mapping application that is executing on a client computing device. The method may receive a mapping data request from the client computing device via a network connection. The mapping data request may include a first geographic location, user context data, and a request time. The method may also analyze the first geographic location, the user context data, and the request time to determine a mapping application context, wherein the mapping application context includes an indication of travel time to a second geographic location indicated by the user context data. The second geographic location may include one or more of an appointment or a user preference that each correspond to one or more graphic elements displayed within a viewport of the digital mapping application. The method may then send the mapping application context to the client computing device.

In a further embodiment, a computer-implemented method may display graphic elements on a digital map based on application data generated or received by an application executing on a client computing device. The method may send a mapping data request from the client computing device via a network connection. The mapping data request may include a current geographic location and a request time. The method may further receive, in response to the mapping data request, mapping data corresponding to the current geographic location. The mapping data may include a plurality of graphic elements that represent the current geographic location. The method may also retrieve user context data generated or received by an application executing on the client computing device. The context data may include a data time and a data location, and the mapping data request current geographic location may correspond to the data location. The method may also determine a difference between the data time and the request time, and determine mapping application context data based on the difference. The mapping application context may include one or more of an indication of travel time to an appointment or a user preference corresponding to one or more of the received graphic elements that represent the current geographic location.

In a still further embodiment, a system may generate a mapping application context for display at a client computing device based on user context data. The system may comprise a user context data system and a mapping system server. The user context data system may include a processor and memory, the memory storing user context data that is at least partially generated or received by an application executing on a client computing device. The user context data may include an appointment time and an appointment location. The mapping system server may include a processor and a memory, the memory storing mapping data that includes a plurality of graphic elements to represent a geographic location using a mapping application of a client computing device. The memory may further store instructions for execution by the mapping system processor. The instructions may receive a mapping data request from the client computing device via a network connection. The mapping data request may include one or more of a current geographic location of the client computing device, user context data, and a request time. The instructions may further analyze the received mapping data request that includes one or more of the current geographic location of the client computing device, the user context, and the request time to determine a mapping application context. The mapping application context may include one or more of an indication of travel time to an appointment or a user preference corresponding to one or more graphic elements corresponding to the current geographic location. The instructions may also send the mapping application context to the client computing device.

In a still further embodiment, a system may generate mapping application context data for display at a client computing device based on user context data. The system may comprise a user context data system and a mapping system. The user context data system may include a processor and memory, the memory storing user scheduled appointment data and user preference data. The user scheduled appointment data may be generated or received by an application executing on a client computing device and may include an appointment time and an appointment location. The mapping system may include a processor and a memory, the memory storing instructions to represent a geographic location with data received from a remote mapping server, the memory further storing instructions for execution by the mapping system processor. The instructions may send a mapping data request from the client computing device via a network connection to the remote mapping server. The mapping data request may include a current geographic location of the client computing device and a request time. The instructions may also receive, in response to the mapping data request, mapping data corresponding to the current geographic location. The mapping data may include a plurality of graphic elements that represent the current geographic location. Further, the instructions may retrieve user context data. The context data may include a context data time and a context data location, and the mapping data request current geographic location may correspond to the context data location. The instructions may then determine a difference between the context data time and the mapping data request time, and determine mapping application context data based on the difference. The mapping application context may includes one or more of an indication of travel time to an appointment or a user preference corresponding to one or more of the received graphic elements that represent the current geographic location.

An apparatus may integrate information related to a geographic area displayed within a viewport of a digital mapping application that is executing on a client computing device. The apparatus may include receiving means to receive a mapping data request from the client computing device via a network connection. The mapping data request may include one or more of a current geographic location of the client computing device, user context data, and a request time. The apparatus may also include analyzing means to analyze the received mapping data request that includes one or more of the current geographic location of the client computing device, the user context, and the request time to determine a mapping application context. The mapping application context may include one or more of an indication of travel time to an appointment or a user preference corresponding to one or more graphic elements corresponding to the current geographic location. The apparatus may include sending means to send the mapping application context to the client computing device.

A further apparatus may display graphic elements on a digital map based on application data generated or received by an application executing on a client computing device. The apparatus may include sending means to send a mapping data request from the client computing device via a network connection. The mapping data request may include a current geographic location and a request time. The apparatus may further include a receiving means to receive, in response to the mapping data request, mapping data corresponding to the current geographic location. The mapping data may include a plurality of graphic elements that represent the current geographic location. Retrieving means may retrieve user context data generated or received by an application executing on the client computing device. The context data may include a data time and a data location, and the mapping data request current geographic location may correspond to the data location. Determining means may determine a difference between the data time and the request time, and determine mapping application context data based on the difference. The mapping application context may include one or more of an indication of travel time to an appointment or a user preference corresponding to one or more of the received graphic elements that represent the current geographic location.

BRIEF DESCRIPTION OF THE DRAWINGS

FIG. 2A is an exemplary mapping interface generated by the system of FIG. 1A based on appointment data;
FIG. 2B is a further exemplary mapping interface generated by the system of FIG. 1A showing further dynamic data from the mapping interface of FIG. 2A.

Figure 1A:
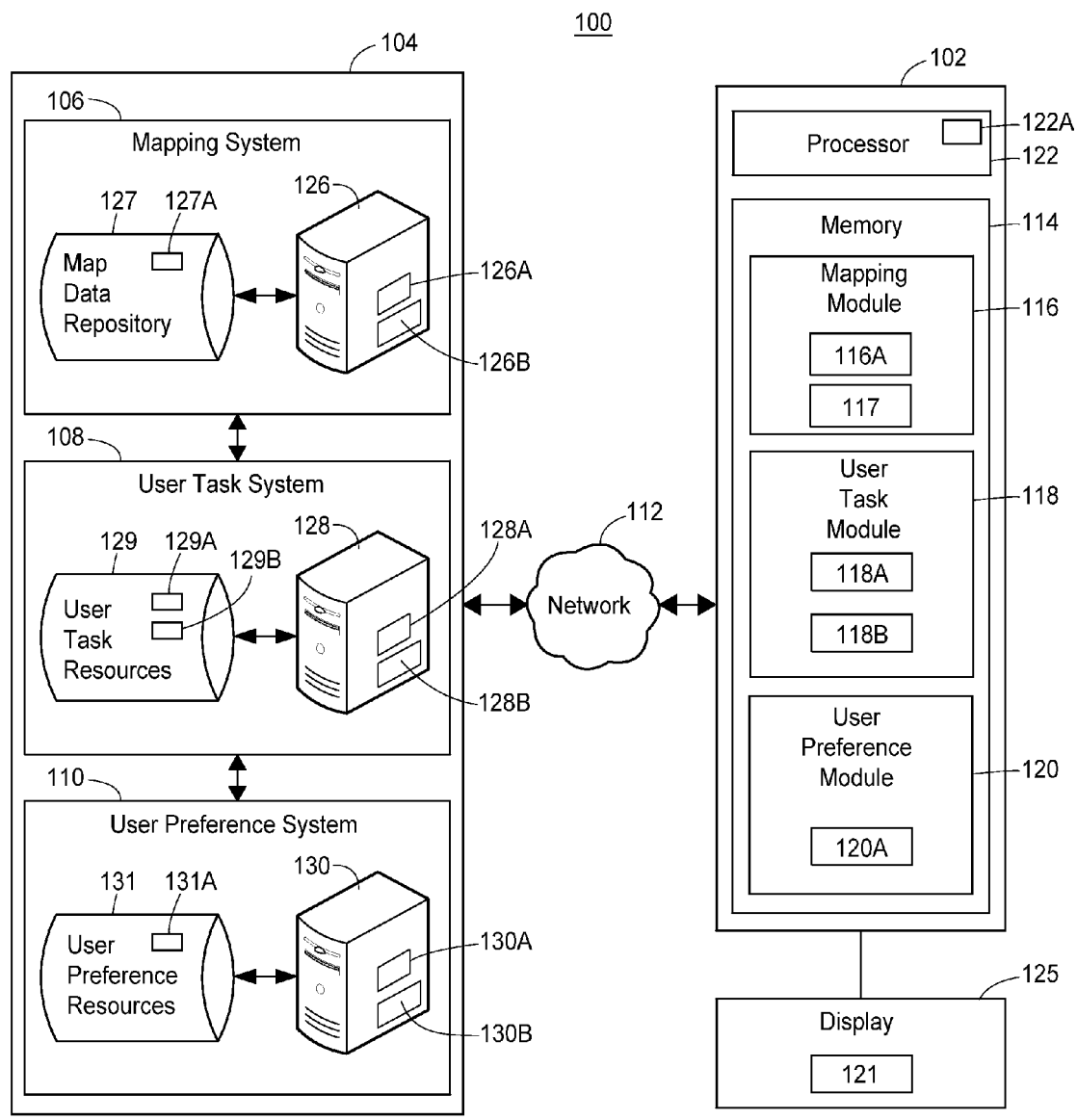
FIG. 1A is a block diagram of a system for displaying dynamic text content with a digital map.

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

Mobile mapping applications are most often used as a tool to complete a search appointment. Users typically open the application with an understanding that they will need to search for what they are looking for. A dynamic entry point for a mobile mapping application may provide a user with relevant predicted locations, information, and actions the moment a user opens the application. The entry point may be visible when a user opens the mapping application on cold-start or when a user clears all of the map states to arrive at the default search omnibox. An omnibox may be a graphic element that allows a user to enter text. An application displaying the omnibox may then use the entered text to perform a variety of functions. For example, the user may enter an address corresponding to a geographic location that may be represented within a graphic map of a mapping application executing on a mobile device. The mapping application may then use the address to perform a geolocation function to display a pointer or other graphic element at a position on a displayed map that corresponds to the address. In further embodiments, text of a partial address may be entered into the omnibox and used by the application to display further text in a drop down box or other graphic element that includes selectable text that predicts or potentially matches a full address. Predicted text may include matches from a variety of sources including the application's search history, bookmarks, or a browsing history. Other icons may appear within the omnibox to indicate information or other actions that may be taken with the text or partial information that is entered within the omnibox. For example, a first icon may represent a navigation function that, when selected, allows the application to execute a navigation function, while a second icon may indicate further information is available about the text entered within the omnibox (e.g., a security alert, an upcoming event for an address entered into the box, weather or other hazard/alert information for an address entered into the box, etc.). The entry point may be shown as a single card under the omnibox and appears to animate from behind the omnibox once data has been pre-fetched or refreshed. When tapped or pulled down, the entry point reveals further detailed information for the data initially shown in the entry point as a "Home Page." When the Home Page opens, the entry point card may animate and expand to become a first card on the Home Page.

In its initial state, the entry point card may display an appointment or other information based on a calendar or other application data that the user might, predictably, want to search for upon opening the mapping application. For example, using appointment information from a calendar application, an entry point card might display a time the user must leave his current location in order to make the appointment on time. Or, by keeping a history of the user's routine movements, the entry point card may display predicted information. For example, the card may display an amount of time to get to work or other information.

Information displayed in the entry point card may refreshed when the user scrolls or otherwise changes the viewport (i.e., the entry point card is always updated to be relevant to whatever geographic area is displayed within the viewport). The entry point card may also have a secondary action that appears as a secondary tap target within the entry point card. When tapped, any specified action supported by the Home Page may be launched. For example, an Upcoming Trips card could show a secondary action that launches turn by turn navigation.

Embodiments of systems and methods for displaying dynamic map content based on calendar, current location, or user routine data are discussed below. To produce a standard map image of a location in a mapping application, or another application, a client computing device may send a mapping request to a map server via a communication network, and the map server in response may provide vector-based map data that allows the mapping application executing on the client computing device to render graphic map elements. In particular, the vector map data may specify various geometric shapes (e.g., using mathematical descriptions) for graphic elements and features of a digital map and indicate how these shapes should be positioned for rendering various map features such as roads, buildings, parks, etc., on the client computing device.

To produce a customized entry point for the mapping application, dynamic map content may be rendered by referencing the user's scheduled appointment and/or the user's preferences or stored routine data in order to specify particular data to display within the entry point. Data regarding the user's scheduled appointment may include a appointment time and a appointment location for various user defined appointments or events (e.g., a dinner reservation, a doctor's appointment, a birthday party event, etc.). By referencing the user's scheduled appointment in a mapping request, the map server or the client device may show information within the entry box based on the time difference between the current real time and the time for the scheduled appointment, and the relationship between the current mapping request geographic location and the appointment/appointment/event location (i.e., between a first and second geographic location). For example, if the user's scheduled appointment involves a dinner reservation that is scheduled on a calendar application executing on the user's mobile computing device, and the user starts the mapping application within a threshold amount of time of the dinner reservation, then the mapping application may display relevant data about the reservation within an entry point card.

For example, the relevant data may include an amount of time until the reservation, a time it would take to get to the restaurant based on the user's current location or a time a user would have to leave the current location to make the reservation on time, various modes of transportation that could get the user to the location in time, or even how late the user will be based on his or her current location. However, if the user opens the mapping application outside of a threshold time of the reservation, then the data displayed within the entry point card may be based on historical or routine data that pertains to a user's habits, past trips near to or related to the user's current location, or interests the user has expressed in the past.

In addition to or in the absence of user defined appointments or events, data regarding the user's daily routines or activities (e.g., a mode of transportation used by the user to get to work, a store or errand visited by the user on weekend afternoons, etc.) may form the basis for the user's scheduled appointment, which may include a routine time and a routine location. By referencing the user's daily routine in a mapping request, the map server or the client device may show information within the entry point card by matching the current real time to the routine time, and the current mapping request geographic location to the routine location. For example, if the user is driving near work on a weekday afternoon and opens the mapping application on the user's mobile computing device, then information displayed within the entry point card may include vector data to inform the user about how far away relevant map elements such as a bank, a post office or other places that the user may visit regularly during weekday afternoons are and whether it is convenient for the user to reach them. In another example, if the user is walking near home on a weekend morning and opens the mapping application on the user's mobile computing device, then information displayed within the entry point card may include vector data to inform the user about how close or convenient (i.e., a time it would take to get there by walking or other mode of transportation) relevant map elements are to the user (such as a grocery store, a park, or other places that the user may visit regularly during weekend mornings).

FIG. 1A is a high-level block diagram that illustrates a system 100 for displaying dynamic map within an entry point card upon startup of a mobile mapping application based on other data such as a user's location, scheduled appointment, routines, and preferences. Generally speaking, the system 100 may include a client computing device 102 (e.g., a smart phone, a tablet computer, a personal computer, etc.) communicating with backend components 104 including a mapping system 106, a user appointment system 108, and a user routine system 110 via a network connection 112 (e.g., a local area network, a wide area network, a mobile network, a wired or wireless network, a private network, etc.). The mapping system 106 may be communicatively coupled to the user appointment system 108 and the user routine system 110. Generally speaking, the client computing device 102 may include a memory 114 storing a mapping module 116, a user appointment module 118, and a user routine module 120 that are executed by a processor 122 with a processor clock 122A.

The mapping system 106 may include a map server 126, which may be in the form of one or more servers including a processor and a memory storing instructions to send and receive map data 127A from a map data repository 127. In response to a mapping data request from the mapping module 116 executing on client device 102 (e.g., upon startup or other user interaction with the mapping module), a processor 126A of the map server 126 may execute instructions 126B to retrieve and send map data 127A for a digital map image to be displayed in a display component 125 of the client device 102.

To render the digital map with dynamic map content, the mapping module 116 may execute instructions 116A to reference application or user context data 117 and send the data along with a mapping data request. The context data 117 may include one or more of data associated with the user's scheduled appointment (scheduled appointment data 118A, routine data 118B) or data associated with the user's preference (user profile data 120A). Generally, the context data 117 may indicate a user's "frame of reference" for opening the mapping application. For example, scheduled appointment data 118A coupled with mapping data may be analyzed to determine how close a user is to a future appointment, past routine action, favorite event or activity, or other information. This context data 117 may serve as the user's "frame of reference" for accessing the mapping application.

One or more of the client computing device 102 or the backend components 104 may collect the scheduled appointment data 118A, routine data 118B, or user preference data 120A with a user's full understanding and acceptance to published terms and conditions for collection and use of that data. For example, before one or more elements of the computing device 102 or the backend components 104 executes an instruction to collect or use this data, a visual or other prompt at the client computing device 102 may alert the user to such action. The prompt allows the user to "opt out" of some or all collection of scheduled appointment data 118A, routine data 118B, user preference data 120A, or any other data as described herein.

Context data 117 may be based on an analysis of schedule appointment data 118A, daily routine data 118B, user preference data 120A, or other data. Scheduled appointment data 118A may be stored in the user appointment module 118 and collected from a variety of applications such as a calendar application, a trip planning application, or other application sources executing on or in communication with the client device 102. Daily routine data 118B may include data associated with the user's typical daily routines or activities (e.g., a route used to go to work every morning, a regular errand location, etc.). The daily routine data 118B may be stored in the user appointment module 118 and collected from various applications such as a user activity tracking application, a search history application, or other application sources executing on or in communication with the client device 102. User preference data 120A indicating the user's interests, likes/dislikes, habits, etc., may be stored in the user routine module 120 and collected from various applications such as a user profile application, a user activity tracking application, or other application sources executing on or in communication with the client device 102.

In some embodiments, scheduled appointment data 118A, daily routine data 118B, and user preference data 120A may, at the user's option and understanding, be collected and stored in the backend components 104. The user appointment system 108 may include one or more user appointment servers 128 and various user appointment resources 129. Data associated with the user's scheduled appointment may be collected from the user appointment resources 129 and stored as scheduled appointment data 129A. Data associated with the user's daily routines or activities may also be collected from the user appointment resources 129 and stored as daily routine data 129B. A processor 128A of the user appointment server 128 may execute instructions 128B to send and receive the scheduled appointment data 128A and the daily routine data 129B from the user appointment resources 129. The user routine system 110 may include one or more user preference servers 130 and various user preference resources 131 (e.g., a user profile application, a social networking application, etc.). Data associated with the user's preference may be collected from the user preference resources 131 and stored as user preference data 131A. A processor 130A of the user preference server 130 may execute instructions 130B to send and receive the user preference data 131A from the user preference resources 131.

In some embodiments, the context data 117 including the scheduled appointment data 118A, daily routine data 118B, or user preference data 120A may be collected from applications executing on the client device 102 and "pushed" to the backend to be stored in the user appointment system 108 and the user routine system 110. In other embodiments, scheduled appointment data 129A, daily routine data 129B, or user preference data 131A may be collected in the backend and "pulled" to the frontend to be stored in the client device 102. In still other embodiments, scheduled appointment data (i.e., 118A, 129A), daily routine data (i.e., 118B, 129B), or user preference data (i.e., 120B, 131B) may be collected and stored among the frontend client device 102, and the backend user appointment system 108 and user routine system 110.

In one embodiment, the client device 102 may send a request for mapping data to the mapping system 106 to initiate a mapping application on the device 102 and display a map. In response to the request, the map server 126 may retrieve and send map data 127A to the mapping module 116. The mapping module 116 may then process the received map data 127A and a mapping application context 121 within an omnibox of a viewport of the mapping application executing on the user's mobile computing device by referencing the context data 117 (i.e., a combination of scheduled appointment data, daily routine data, and user preference data stored in either the client device 102 or the backend user appointment system 108 and user routine system 110). In another embodiment, the client device 102 may send a request for mapping data to the mapping system 106 to display a map on the device 102 corresponding to the location at which the user initiated the mapping module 116 on the device 102. In response to the request, the map server 126 may first retrieve and process map data 127A and render a mapping application context 121 within an entry point card displayed within the viewport displayed within the display 125 by referencing context data 117 that is a combination of scheduled appointment data, daily routine data, and user preference data stored in either the client device 102 or the backend user appointment system 108 and user routine system 110. The map server 126 may then send the map and mapping application context 121 to be displayed within the viewport and dynamic map content to be displayed within the entry point card to the mapping module 116 for subsequent display on the client device 102.

In some embodiments, the mapping module 116 may receive map data in the form of graphic components, text, and other data. The received data may include vector data that specifies the map features such as geometric shapes using mathematical descriptions of points and paths connecting the points. For example, rather than specifying each pixel that makes up a raster image of a line segment or other graphic elements, vector data may specify the two endpoints of the line segment and indicate that the two endpoints are connected by a straight line. The mapping module 116 then may apply style and other data as appropriate to the specified line segment, so that the line segment is displayed with a particular title, description, etc. As another example, the vector data may specify the contour of a building, and corresponding text data may specify the name, description, web page, contact information, address, etc., of the building. In other words, rather than receiving raster images from the map server 126, the mapping module 116 may receive instructions for drawing a map image on the display component 125 of the client device 102 and execute the instructions to generate a raster map image. The received data may also include dynamic text data corresponding to the scheduled appointment data, daily routine data, and user preference data that is displayed within an entry point card of the viewport for the mapping module 116.

For simplicity, the client device 102 is illustrated with a single processor 122 to execute various modules stored in the device memory 114, as described herein. The client device 102 in other embodiments may include additional processing units (not shown) such as a graphics processing unit (GPU) configured to facilitate image rendering on the display component 125, for example. Further, the mapping module 116 may utilize a library of graphics functions for efficiently generating a map image. For example, the memory 114 may store a plugin, such as an OpenGL® or Direct3D® library, having functions for rendering graphics which various applications executing on the client 102, including the mapping module 116, may access via an application programming interface (API). In another embodiment, the memory 114 stores a plugin particularly suitable for browser applications, such as WebGL®, for example. Also, in some embodiments, the memory 114 stores additional software components that facilitate efficient rendering of images via the display 125. For example, the memory 114 may store an Adobe® Flash® plugin or an O3D plugin.

Figure 1B:
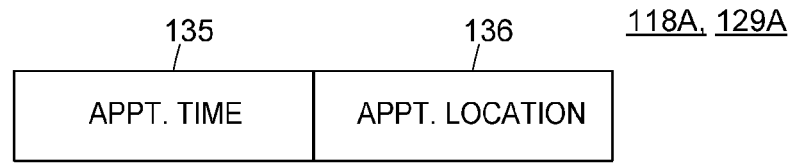
FIG. 1B is a block diagram of a data structure associated with scheduled appointment data.
Figure 1C:
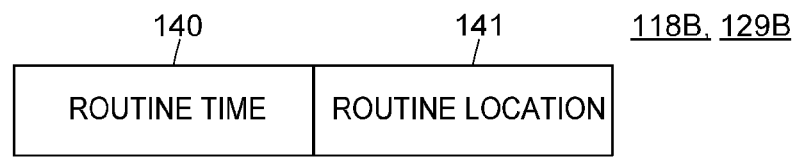
FIG. 1C is a block diagram of a data structure associated with daily routine data.
Figure 1D:
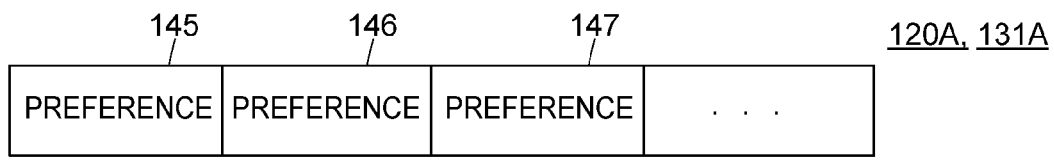
FIG. 1D is a block diagram of a data structure associated with user preference data.

With reference to FIGS. 1B, 1C, and 1D, scheduled appointment data (i.e., 118A, 129A) may include a appointment time 135 and a appointment location 136 for various user defined appointments or events. Daily routine data (i.e., 118B, 129B) may include a routine time 140 and a routine location 141 that correspond to the user's typical daily routines or activities. User preference data (i.e., 120A, 131A) may include preferences 145 to 147, each indicating a preference for the user (i.e., the user's interests, likes/dislikes, habits, etc.). For example, preference 145 may include data that indicate the user enjoys a particular restaurant, preference 146 may include data that indicate the user's place of employment, and preference 147 may include data that indicate the user is an avid golfer. While FIG. 1D illustrates user preference data (i.e., 120A, 131A) as having three user preferences, the data in general may have any number of preferences.

Figure 1E:
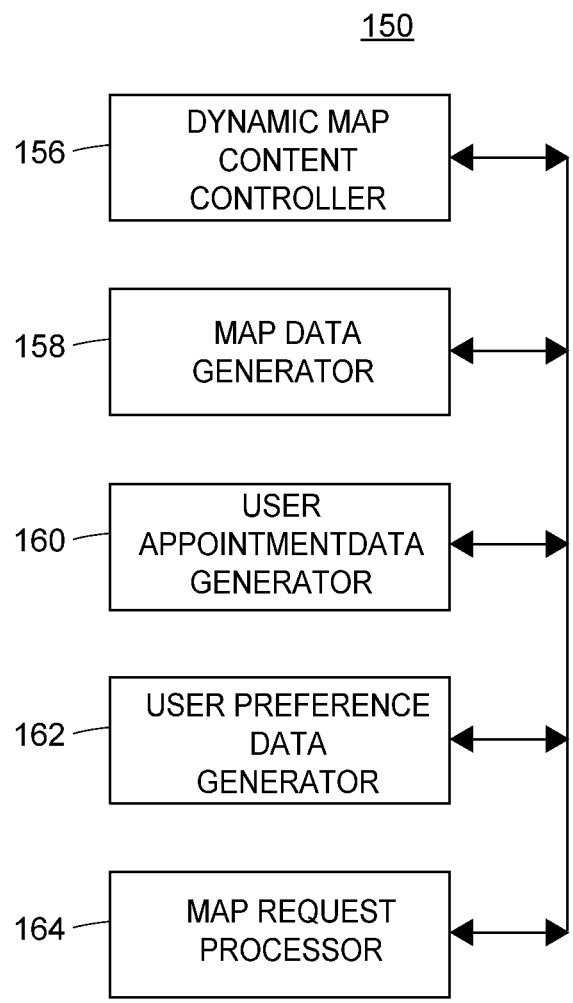
FIG. 1E is a block diagram of a component of the system for displaying dynamic map text content with a digital map on a mobile computing device.

With reference to FIG. 1E, a map controller 150 of the client device mapping module 116 or the backend map server 126 may include various functions to process and render a map with dynamic map content based on the user's location, scheduled appointment, preferences, and other data. According to an embodiment, the map controller 150 may operate as a set of instructions (i.e., 116A, 126B) in either the client device 102 or the mapping system 106, or the various functions may be split among the client device 102 and the mapping system 106.

According to an embodiment, the map controller 150 may include a dynamic map content controller 156, communicatively coupled to a map data generator 158, a user appointment data generator 160, a user preference data generator 162, and a map request processor 164. After the map request processor 164 receives a request for mapping data to display a map for a user's current geographic location upon startup of the mapping module 116, the map request processor 164 may execute a function call to the map data generator 158 to retrieve map data 127A from the map data repository 127 for the requested geographic location. The map data generator 158 may include instructions to generate the map data as a set of map tile descriptors, such that each map tile descriptor describes a map tile (i.e., a portion of a map image of a certain size). The size of a geographic region represented by an individual map tile depends on the zoom level with which the map tile is associated, so that a single map tile at a lower zoom level illustrates a larger geographic area than a single map tile at a higher zoom level. The map data generator 158 may generate each map tile descriptor according to a vector graphics format, and a client device, such as the client device 102 of FIG. 1A, may locally generate a raster image for each tile.

To render a mapping application context 121 on the map within an entry point card of an omnibox, the map request processor 164 may execute a function call to the user appointment data generator 160 to access user context data 117 (e.g., scheduled appointment data (i.e., 118A, 129A) or daily routine data (i.e., 118B, 129B)), which may be retrieved from the client device 102 or the backend user appointment system 108. The map request processor 164 may also execute a function call to the user preference appointment generator 162 to access user preference data (i.e., 120A, 131A), which may be retrieved from the client device 102 or the backend user routine system 110.

The dynamic map content controller 156 may read scheduled appointment data (i.e., 118A, 129A) to determine the time difference between the current real time (e.g., determined from the processor clock 122A) and the appointment time, and the relationship between the startup mapping request geographic location and the appointment location. Based on this information, the dynamic map content controller 156 may include a mapping application context 121 to display within an entry point card. For example, where the relationship is beyond a threshold amount of time, the dynamic map content controller 156 may not include text data for display (e.g., if the schedule appointment data indicates an appointment for next week, then the relationship may be beyond the time threshold. However, if the scheduled appointment data indicates an appointment that is the same day, then the text data may indicate a time the user must leave his or her current location in order to make the appointment on time). Generally, the mapping application context 121 may dynamically change depending on a relationship between the current time to the appointment time, and the current location to the appointment location.

In addition, the dynamic map content controller 156 may read the user preference data (i.e., 120A, 131A) to determine user-tailored text or other features for the entry point card in order to provide the user with a more personalized map viewing experience. The dynamic map content controller 156 may also read daily routine data (i.e., 118B, 129B) to match the current real time (e.g., determined from the processor clock 122A) to the routine time, and the current (i.e., startup) mapping geographic location to the routine location. The dynamic map content controller 156 may then determine the mapping application context 121 to display within an entry point card of an omnibox. For example, with reference to FIG. 2A, upon startup of the mapping module 116, the system 100 determines that the user has a scheduled appointment that corresponds to a dinner reservation in two hours' time. If the user starts the mapping module 116 with the mobile device 102 at a geographic location within a threshold distance of the restaurant, and within a threshold time to the reservation (e.g., within fifty miles of the restaurant and within two hours of the reservation), then the dynamic map content controller 156 may display a mapping application context 121 within an entry card 204 of an omnibox 206.

Figure 2C:
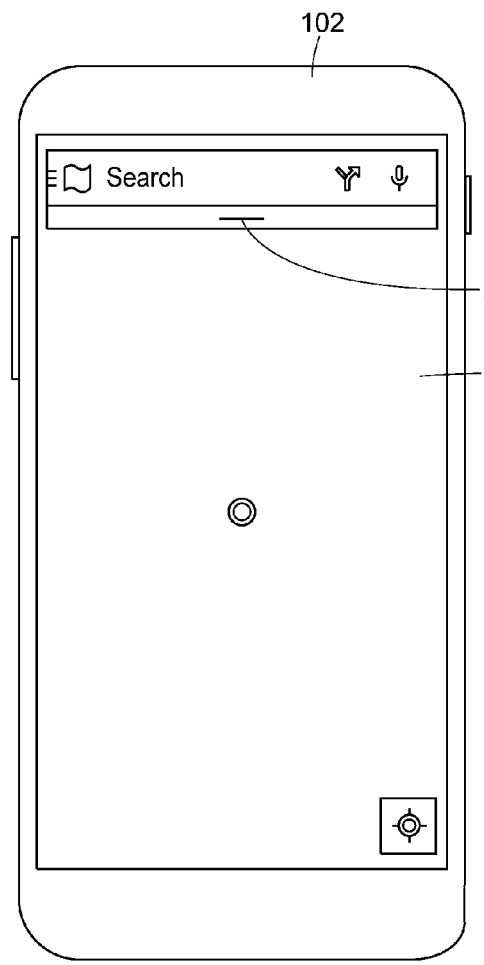
FIG. 2C is a further exemplary mapping interface generated by the system of FIG. 1A showing further dynamic data from the mapping interface of FIGS. 2A and 2B.

With reference to FIG. 2B, further information 250 may also be displayed within the viewport 200 if the device 102 receives an indication of a gesture within the entry card 204. For example, Home Page information 250 may be displayed if the device 102 detects a downward swiping gesture within the entry point card 204. The Home Page information 250 may include appointment or other information corresponding to the originally displayed mapping application context 121 displayed within the entry point card 204. With reference to FIG. 2C, if the device does not detect any gesture within the entry point card 204, then the card 204 may collapse into the omnibox 206 and display a small draggable element 275. If the device detects a gesture on the small draggable element, then the entry point card 204 or the Home Page information 250 may appear within the view port 200.

Figure 2D:
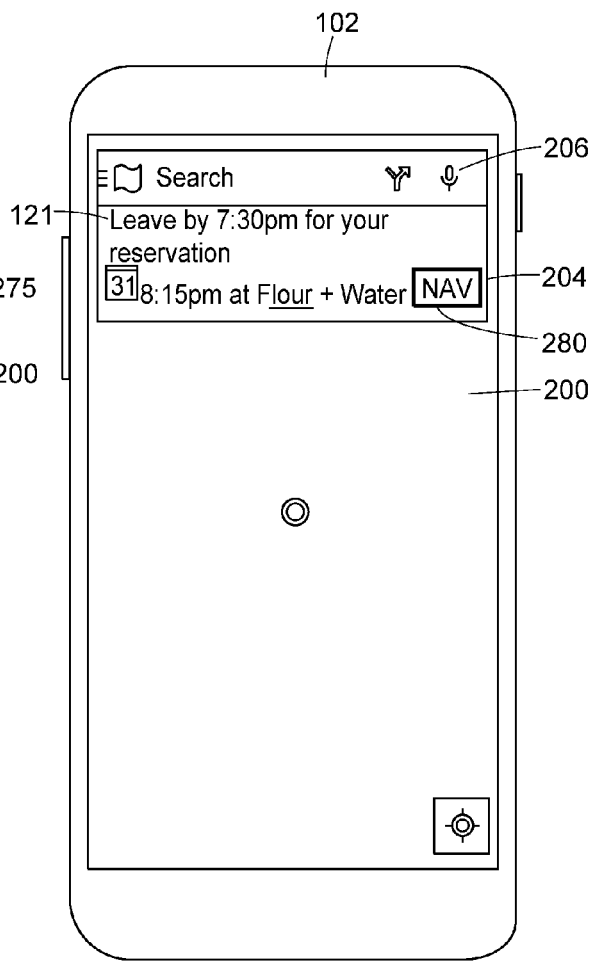
FIG. 2D is a further exemplary mapping interface generated by the system of FIG. 1A showing further dynamic data from the mapping interface of FIG. 2C.

With reference to FIG. 2D, in some embodiments, the entry point card 204 may have a secondary action which is tappable and appears as a second tap target 280. For example, when the device 102 detects a gesture (e.g., a tap) within the entry point card on the tap target 280, the mapping application 116 may launch a navigation process for a location indicated in the mapping application context 121 or the Home Page information 250. Of course, any other secondary action using the device 102 may also be initiated using the secondary tap target including a web search, opening calendar application, performing a map search for a location indicated in the entry point card 204, etc.

Figure 2E:
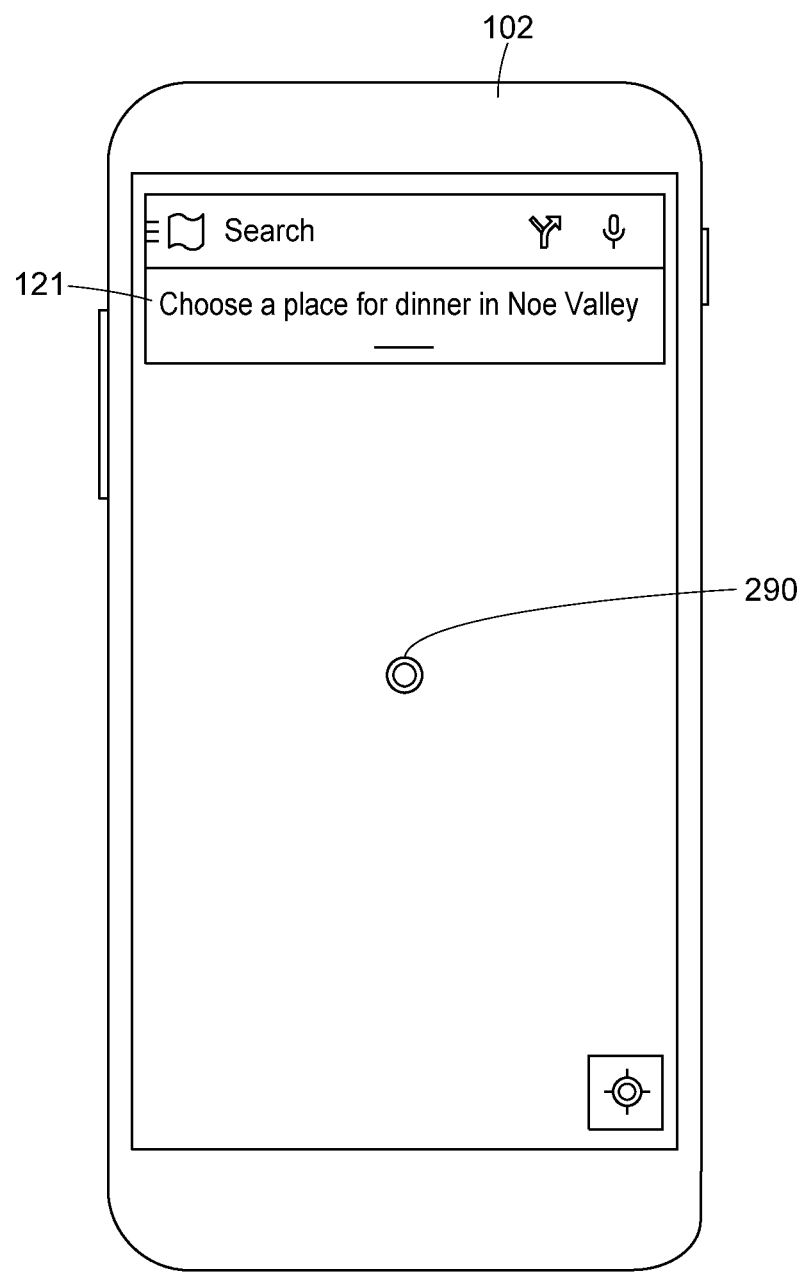
FIG. 2E is a further exemplary mapping interface generated by the system of FIG. 1A showing further dynamic data.

With reference to FIG. 2E, in further embodiments, the entry card 204 may include a reverse-geocoded name of a current viewport down to a corridor/neighborhood level for small viewports 200, or up to a country level for large viewports. For example, when a user's current location 290 is "home" or "work" or any other named location as stored in the user preference data 120A, the stored location name may be displayed within the mapping application context 121. When the current location corresponds to a neighborhood, the neighborhood name may be displayed within the mapping application context 121.

In further embodiments, the mapping application context 121 may include time and weather conditions. For example, when the weather is rainy, the context 121 may indicate raindrops within the entry point card 204 or some other indication.

On cold start of the mapping application 116 or when a user clears the omnibox of all search terms, the entry point card 204 may become visible once a mapping application context 121 is fetched in the background. In some embodiments, once a mapping application context is determined, the entry point card 204 including mapping application context data 121 may drop down to display the data 121.

The entry point card 204 may refresh once activity with the mapping application n116 within the viewport 200 decreases or ceases altogether for a threshold amount of time. In some embodiments, when a refresh action results in the same information for the mapping application context 121, the entry point card 204 may remain in a collapsed state. However, when a refresh action results in a new mapping application context 121, then the card 204 may animate and drop down from behind the omnibox 206. Further, the application 116 may cache the mapping application context data 121 such that cached content appears at the top of the card 204 while new context data 121 loads in below the cached data.

Figure 3:
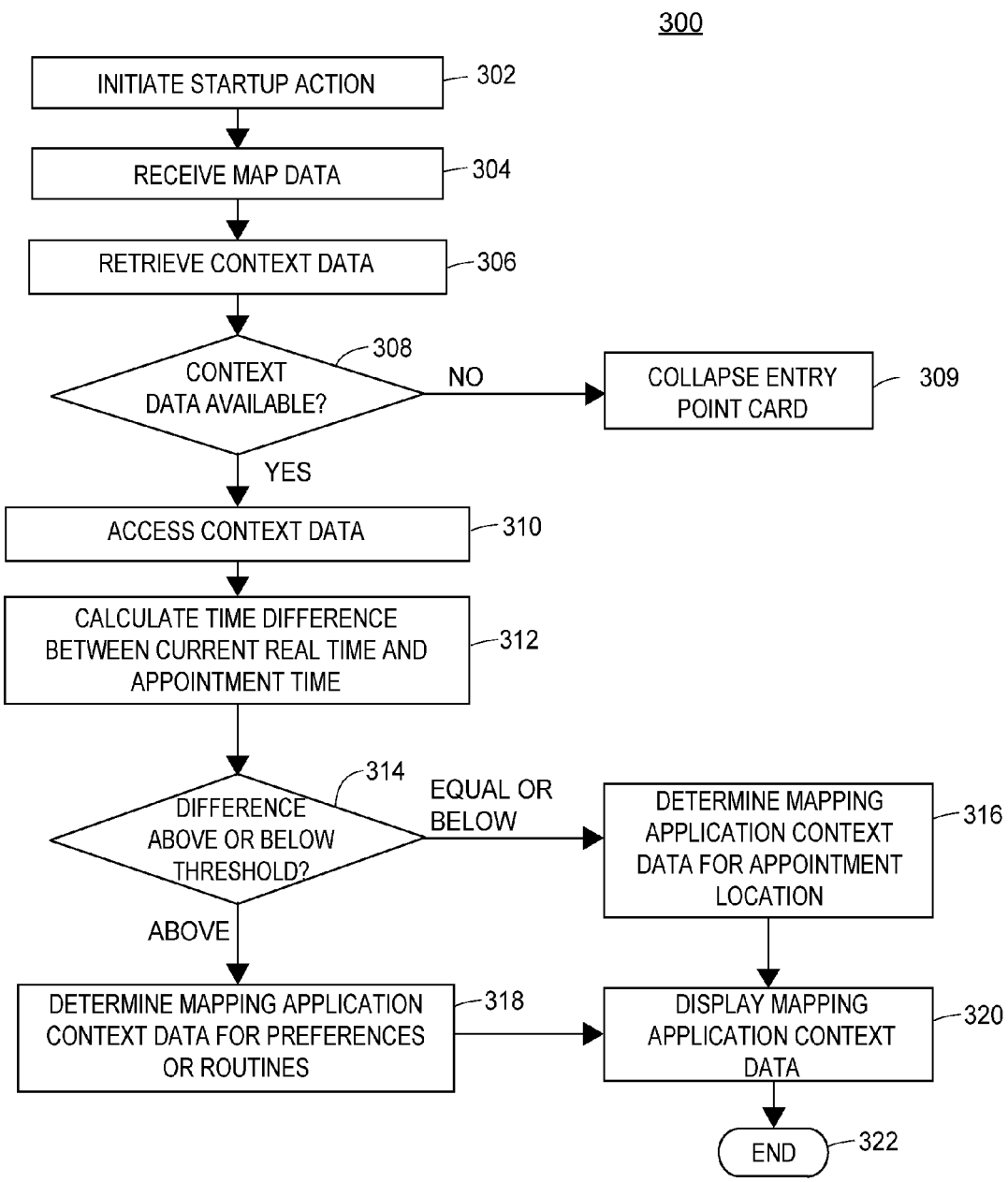
FIG. 3 is an exemplary flow chart of a method for displaying dynamic map content, as described herein.

FIG. 3 is a flow diagram of an example method 300 for displaying a mapping application context 121 within an entry point card 204 of a viewport 200. The method 300 may include one or more blocks, routines or functions in the form of computer-executable instructions that are stored in a tangible computer-readable medium (e.g., 116A, 126B, 128B, 130B) and executed using the processor 122 of the client device 102 or one or more of the backend server processors (e.g., 126A, 128A, 130A). The method 300 may execute at either the frontend device 102 or the backend components 104. FIG. 3 will be described with reference to FIGS. 1A, 1B, 1C, 1D, 1E, 2A, 2B, 2C, 2D, and 2E for ease of explanation, but the method 300 may of course be utilized with other objects and user interfaces.

At block 302, the mapping module 116 of the client device 102 may execute an operation upon startup of the application 116. For example, the mapping module 116 may execute a function call to the mapping system 106 via the network 112 to request map data 127A corresponding to a current user geographic location to be sent to the mapping module 106 to display a map within the display component 125 of the device 102.

At block 304, the mapping module 116 may receive the requested map data 127A (i.e., map tile data) sent from the mapping system 106 once the system 106 matches a geographic location of the request to the map data 127A and the system 106 sends the matched data to the client device 102. In some embodiments, the system 106 may send the matched data in a vector format, as described herein. The received map data 127A may include a plurality of graphic elements that, when rendered by the client device, depict various map features (e.g., a building, a store, streets, etc.).

To render dynamic map content on the map displayed at the client device 102, the method 300 may cause instructions to be executed at block 306 to retrieve context data 117 from either the client device 102 or the user appointment system 108 or the user preference system 110. The context data 117 may include one or more of scheduled appointment data (i.e., 118A, 129A) and daily routine data (i.e., 118B, 129B). Block 306 may also cause instructions to be executed to retrieve user preference data (i.e., 120A, 131A) from either the device 102 or the user routine system 110.

At block 308, the method 300 may determine whether context data 117 is available. For example, the block 308 may cause instructions to be executed to determine if scheduled appointment data (i.e., 118A, 129A) is available. If context data (e.g., scheduled appointment data 118A, 129A) is not available, the block 308 may cause instructions to be executed to collapse the entry point card at block 309, and return the method 300 to block 304, as above. If context data is available, then the method 300 may proceed to block 310 to read the context data 117 retrieved in block 306 and determine an appointment time 135 and appointment location 136. At block 312, the method 300 may calculate a time difference between the current real time (e.g., determined from the processor clock 122A) and the appointment time 135. The method 300 may then proceed to block 314 to quantify the time difference to determine if the amount of time before the appointment time 135 is below a threshold (e.g., a couple of hours before the appointment time), or if the amount of time before the appointment time 135 is above a threshold (e.g., a week before the appointment time).

At block 316, if the time difference and distance to the appointment location is small (e.g., the time difference and distance is below a threshold), then the method 300 may cause instructions to be executed to determine the mapping context data 121. In some embodiments, block 316 may include instructions to include context data such as a present location (e.g., work, home), weather, and time data. The mapping application context data may also include upcoming trip data that depends on the current time and location (e.g., "Leave by 7:24 for your restaurant reservation" or "Next train for Home departs at 6:24 pm" etc.). Where no user context data 117 is indicated, or the time difference and distance to the appointment location is large (e.g., the time difference and distance is above a threshold), at block 318m 318, the method may execute instructions to determine mapping application context data 121 based on user preference data 131A. The mapping application context data 121 for block 318 may include exploration options for a current user location based on user preference data 131A or other user data (e.g., "Explore this neighborhood" or based on an expressed interest in golf, "Driving range 10 minutes away" etc.). The mapping application context data 121 may also include directions or information for user favorite locations, locations for routine errands or habitual destinations, etc. At block 318, the method 300 may also determine whether daily routine data (i.e., 118B, 129B) is available. If daily routine data (i.e., 118B, 129B) is available, then the method 300 may read the daily routine data (i.e., 118B, 129B) retrieved in block 306 and determine the routine time 140 and routine location 141. The method 300 may then proceed to block 320 to execute instructions for displaying the mapping application context 121 within an entry point card 204 displayed on the client computing device 102. The method may terminate at block 322.

If scheduled appointment data (i.e., 118A, 129A) is determined to be not available at block 309, then the method 300 may proceed directly to block 318 to determine whether daily routine data (i.e., 118B, 129B) is available. If daily routine data (i.e., 118B, 129B) is determined to be not available at block 318, then the method 300 may terminate at block 322.

Using the system 100 and method 300 described herein, an electronic map system may be implemented for displaying mapping application context data 121 within an entry point card 204 of a mapping application omnibox 206 based on a user's location, scheduled appointment, preferences and routines. By referencing data associated with the user's scheduled appointment and preference in response to a request for mapping data for specific locations, or in response to a startup action or a refresh action, the styling and appearance of digital maps may be rendered to provide more targeted and useful information to the user.

Figure 4:
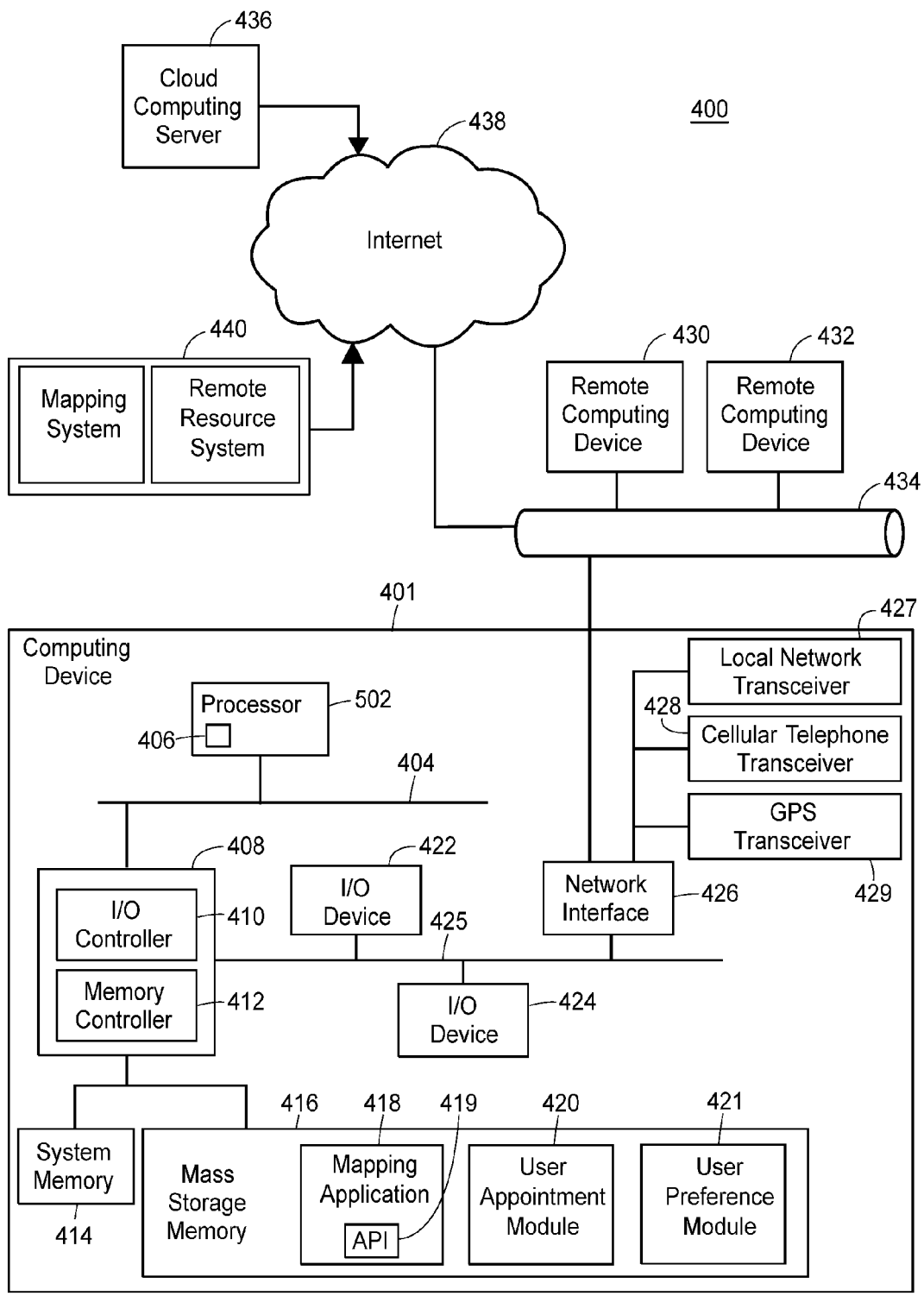
FIG. 4 is a block diagram of a computing environment that implements a system and method for displaying dynamic map content on a mobile computing device.

FIG. 4 is a high-level block diagram of an example computing environment for a mobile mapping system 400 having a computing device 401 that may be used to implement the method and systems described herein. The computing device 401 may include a mobile computing device 102 (e.g., a cellular phone, a tablet computer, a Wi-Fi-enabled device or other personal computing device capable of wireless or wired communication), a thin client, or other known type of computing device. As will be recognized by one skilled in the art, in light of the disclosure and teachings herein, other types of computing devices can be used that have different architectures. Processor systems similar or identical to the example mobile mapping system 400 may be used to implement and execute the example system of FIG. 1A, the data structures of FIGS. 1B, 1C, 1D, 1E, the method of FIG. 3, and the like. Although the example mobile mapping system 400 is described below as including a plurality of peripherals, interfaces, chips, memories, etc., one or more of those elements may be omitted from other example processor systems used to implement and execute the example system 100 to display dynamic map content based on the user's location, scheduled appointment and preference. Also, other components may be added.

As shown in FIG. 4, the computing device 401 includes a processor 502 that is coupled to an interconnection bus 404. The processor 402 includes a register set or register space 406, which is depicted in FIG. 4 as being entirely on-chip, but which could alternatively be located entirely or partially off-chip and directly coupled to the processor 402 via dedicated electrical connections and/or via the interconnection bus 404. The processor 402 may be any suitable processor, processing unit or microprocessor. Although not shown in FIG. 4, the computing device 401 may be a multi-processor device and, thus, may include one or more additional processors that are identical or similar to the processor 402 and that are communicatively coupled to the interconnection bus 404.

The processor 402 of FIG. 4 is coupled to a chipset 408, which includes a memory controller 412 and a peripheral input/output (I/O) controller 410. As is well known, a chipset typically provides I/O and memory management functions as well as a plurality of general purpose and/or special purpose registers, timers, etc. that are accessible or used by one or more processors coupled to the chipset 408. The memory controller 412 performs functions that enable the processor 402 (or processors if there are multiple processors) to access a system memory 414 and a mass storage memory 416, that may include either or both of an in-memory cache (e.g., a cache within the memory 414) or an on-disk cache (e.g., a cache within the mass storage memory 416).

The system memory 414 may include any desired type of volatile and/or non-volatile memory such as, for example, static random access memory (SRAM), dynamic random access memory (DRAM), flash memory, read-only memory (ROM), etc. The mass storage memory 416 may include any desired type of mass storage device. For example, if the computing device 401 is used to implement a mapping application 418 having an API 419, a user appointment module 420, and a user routine module 421. The mass storage memory 416 may include a hard disk drive, an optical drive, a tape storage device, a solid-state memory (e.g., a flash memory, a RAM memory, etc.), a magnetic memory (e.g., a hard drive), or any other memory suitable for mass storage. As used herein, the terms module, block, function, operation, procedure, routine, step, and method refer to tangible computer program logic or tangible computer executable instructions that provide the specified functionality to the computing device 401 and the mobile mapping system 400. Thus, a module, block, function, operation, procedure, routine, step, and method can be implemented in hardware, firmware, and/or software. In one embodiment, program modules and routines (e.g., the mapping application 418, the API 419, the user appointment module 420, the user routine module 421, etc.) are stored in mass storage memory 416, loaded into system memory 414, and executed by a processor 402 or can be provided from computer program products that are stored in tangible computer-readable storage mediums (e.g. RAM, hard disk, optical/magnetic media, etc.).

The peripheral I/O controller 410 performs functions that enable the processor 402 to communicate with peripheral input/output (I/O) devices 422 and 424, a network interface 426, a cellular network transceiver 428, a local network transceiver 427, and a GPS transceiver 429 (via the network interface 426) via a peripheral I/O bus 425. The I/O devices 422 and 424 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The I/O devices 422 and 424 may be used with the mapping application 418, the user appointment module 420, and the user routine module 421 to receive GPS data from the GPS transceiver 429, send the GPS data to the backend components of the system 100, render, and display maps and user interfaces as described in relation to the figures. A cellular telephone transceiver 428 may be resident with the local network transceiver 427. The local network transceiver 427 may include support for a Wi-Fi network, Bluetooth, Infrared, or other wireless data transmission protocols. In other embodiments, one element may simultaneously support each of the various wireless protocols employed by the computing device 401. For example, a software-defined radio may be able to support multiple protocols via downloadable instructions. In operation, the computing device 401 may be able to periodically poll for visible wireless network transmitters (both cellular and local network) on a periodic basis. Such polling may be possible even while normal wireless traffic is being supported on the computing device 401. The network interface 427 may be, for example, an Ethernet device, an asynchronous transfer mode (ATM) device, an 802.11 wireless interface device, a DSL modem, a cable modem, a cellular modem, etc., that enables the system 100 to communicate with another computer system having at least the elements described in relation to the system 100.

While the memory controller 412 and the I/O controller 410 are depicted in FIG. 4 as separate functional blocks within the chipset 408, the functions performed by these blocks may be integrated within a single integrated circuit or may be implemented using two or more separate integrated circuits. The mobile mapping system 400 may also implement the mapping application 418, the user appointment module 420, and the user routine module 421 on remote computing devices 430 and 432. The remote computing devices 430 and 432 may communicate with the computing device 401 over an Ethernet link 434. For example, the computing device 401 may receive mapping data created by a mapping application executing on a remote computing device 430, 432. In some embodiments, the mapping application 418, the user appointment module 420 and/or the user routine module 421 may be retrieved by the computing device 401 from a cloud computing server 436 via the Internet 438. When using the cloud computing server 436, the retrieved mapping application 418, the user appointment module 420 and/or the user routine module 421 may be programmatically linked with the computing device 401. The mapping application 418, the user appointment module 420 and/or the user routine module 421 may be a Java® applet executing within a Java® Virtual Machine (JVM) environment resident in the computing device 401 or the remote computing devices 430, 432. The mapping application 418, the user appointment module 420 and/or the user routine module 421 may also be "plug-ins" adapted to execute in a web-browser located on the computing devices 401, 430, and 432. In some embodiments, the mapping application 418, the user appointment module 420 and/or the user routine module 421 may communicate with back end components 440 such as the mapping system 106, the user appointment system 108, and the user routine system 110 via the Internet 438.

The system 400 may include but is not limited to any combination of a LAN, a MAN, a WAN, a mobile, a wired or wireless network, a private network, or a virtual private network. Moreover, while only three remote computing devices 430 and 432 are illustrated in FIG. 4 to simplify and clarify the description, it is understood that any number of client computers are supported and can be in communication within the system 400.

Additionally, certain embodiments are described herein as including logic or a number of components, modules, or mechanisms. Modules may constitute either software modules (e.g., code or instructions embodied on a machine-readable medium or in a transmission signal, wherein the code is executed by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" means that a particular element, feature, structure, or characteristic described in connection with the embodiment is included in at least one embodiment. The appearances of the phrase "in some embodiments" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the figures depict preferred embodiments of a system for displaying dynamic map content based on the user's location and application data for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for a system and a process for displaying mapping application context data based on the user context data including a user's location, scheduled appointment and preference for subsequent display on a mobile computing device through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for integrating information related to an appointment displayed on a client computing device, the method comprising:
retrieving, by one or more processors, a current geographic location of the client computing device;
retrieving, by one or more processors, appointment data generated or received by an application executing on the client computing device, the appointment data including an appointment time and an appointment location;
determining, by one or more processors, whether a time difference between the appointment time and a current time is below a threshold;
determining, by one or more processors, at least a travel time from the current geographic location to the appointment location using (i) the time difference, (ii) the current geographic location and (iii) the appointment location; and
sending, by one or more processors, an indication of travel time to the client computing device for generating an automatic notification via a user interface of the client computing device.

2. A method for displaying graphic elements on a digital map based on application data generated or received by an application executing on a client computing device, the method comprising:
sending, by one or more processors, a mapping data request from the client computing device via a network connection, the mapping data request including a current geographic location of the client computing device and a request time;
receiving, by one or more processors in response to the mapping data request, mapping data corresponding to the current geographic location, wherein the mapping data includes a plurality of graphic elements that represent the current geographic location;

retrieving, by one or more processors, appointment data generated or received by an application executing on the client computing device, the appointment data including an appointment time and an appointment location, determining, by one or more processors, whether a time difference between the appointment time and the request time is below a threshold; and determining, by one or more processors, mapping application context data using (i) the time difference, (ii) the current geographic location and (iii) the appointment location, wherein the mapping application context includes an indication of travel time to the appointment location.

3. The method of claim 2, wherein the user appointment data further includes a scheduled appointment of a calendar application executing on the client computing device.

4. The method of claim 2, wherein determining the mapping application context data includes one or more of an indication of travel time to an appointment corresponding to one or more graphic elements that represent the current geographic location.

5. The method of claim 2, further comprising displaying a modified mapping data on the client computing device.

6. The method of claim 2, wherein displaying the modified mapping data on the client computing device includes modifying text within an entry point card or an omnibox displayed within a viewport of the mapping application.

7. A system for integrating information related to an appointment displayed on a client computing device, the system comprising:

an appointment data system including a processor and memory, the appointment data that is at least partially generated or received by an application executing on a client computing device, wherein the appointment data includes an appointment time and an appointment location;

an appointment data system server including a processor and a memory, the memory storing appointment data using an appointment application of a client computing device, the memory further storing instructions for execution by an appointment system processor to:

retrieve a current geographic location of the client computing device;

retrieve appointment data generated or received by an application executing on the client computing device, the appointment data including an appointment time and an appointment location;

determine whether a time difference between the appointment time and a current time is below a threshold;

determine at least a travel time from the current geographic location to the appointment location using (i) the time difference, (ii) the current geographic location and (iii) the appointment location; and send an indication of travel time to the client computing device for generating an automatic notification via a user interface of the client computing device.

8. A system for generating mapping application context data for display at a client computing device based on appointment data, the system comprising:

an appointment data system including a processor and memory, the memory storing user scheduled appointment data, wherein the user scheduled appointment data is generated or received by an application executing on a client computing device and includes an appointment time and an appointment location, and;

a mapping system including a processor and a memory, the memory storing instructions to represent a geographic location with data received from a mapping server, the memory further storing instructions for execution by the mapping system processor to:

send a mapping data request from the client computing device via a network connection to the remote mapping server, the mapping data request including a current geographic location of the client computing device and a request time;

receive in response to the mapping data request, mapping data corresponding to the current geographic location, wherein the mapping data includes a plurality of graphic elements that represent the current geographic location;

receive appointment data, generated or received by an application executing on the client computing device, the appointment data including an appointment time and appointment location;

determine whether a time difference between the appointment time and the request time is below a threshold; and determine mapping application context data using (i) the time difference, (ii) the current geographic location and (iii) the appointment location, wherein the mapping application context includes an indication of travel time to the appointment location.

9. The system of claim 8, wherein the appointment data includes an appointment time and an appointment location, the instructions to determine the difference between an application data time and the request time include instructions to determine that the difference between the application data time and the request time is below a threshold, and the user appointment data further includes a scheduled appointment of a calendar application executing on the client device.

10. The system of claim 9, wherein the instructions to determine the mapping application data includes one or more of an indication of travel time to an appointment corresponding to one or more graphic elements that represent the current geographic location.

11. The computer-implemented method of claim 1, further comprising:

receiving, by one or more processors, from the client computing device, a request for mapping data via a network connection; and in response to the received request, sending to the client computing device map data for generating a digital map for the current geographic location of the client computing device.

12. The computer-implemented method of claim 1, wherein the appointment data further includes a scheduled appointment of a calendar application executing on one or more processors.

13. The computer-implemented method of claim 1, wherein a response to a mapping request from the client computing device, a map server retrieves and sends map data to a mapping module; and the mapping module processes the current geographic location of the client computing device and displays the current geographical location on the client computing device.

14. The computer-implemented method of claim 1, further comprising:

retrieving weather conditions for the current geographic location; and displaying weather conditions for the current geographic on client computing device.

15. The computer-implemented method of claim 1, further comprising displaying on the client user device the time the user must leave the current geographical location in order to arrive at the appointment location on time.

\* \* \* \* \*